United States Patent [19]

Quaeck

[11] Patent Number: 5,323,894
[45] Date of Patent: Jun. 28, 1994

[54] RECIPROCATING FLOOR CONSTRUCTION

[76] Inventor: Manfred W. Quaeck, 1515 - 210th Ave. NE., Redmond, Wash. 98053

[21] Appl. No.: 22,524

[22] Filed: Feb. 25, 1993

Related U.S. Application Data

[60] Continuation-in-part of Ser. No. 944,697, Sep. 14, 1992, Pat. No. 5,228,556, which is a division of Ser. No. 749,522, Aug. 26, 1991, Pat. No. 5,165,525.

[51] Int. Cl.$^5$ ............................................. R65G 25/04
[52] U.S. Cl. ..................................................... 198/750
[58] Field of Search ..................... 198/750; 414/525.1, 414/525.9

[56] References Cited

U.S. PATENT DOCUMENTS

| | | |
|---|---|---|
| Re. 33,196 | 4/1990 | Foster . |
| 3,534,875 | 10/1970 | Hallstrom . |
| 4,143,760 | 3/1979 | Hallstrom . |
| 4,144,963 | 3/1979 | Hallstrom . |
| 4,157,761 | 6/1979 | Debor . |
| 4,184,587 | 1/1980 | Hallstrom . |
| 4,492,303 | 1/1985 | Foster . |
| 4,580,678 | 4/1986 | Foster . |
| 4,611,708 | 9/1986 | Foster . |
| 4,679,686 | 7/1987 | Foster . |
| 4,691,819 | 9/1987 | Hallstrom . |
| 4,727,978 | 3/1988 | Hallstrom . |
| 4,749,075 | 6/1988 | Foster . |
| 4,785,929 | 11/1988 | Foster . |
| 4,856,645 | 8/1989 | Hallstrom . |
| 4,940,132 | 7/1990 | Foster . |
| 5,064,052 | 11/1991 | Foster . |
| 5,088,595 | 2/1992 | Hallstrom . |
| 5,096,356 | 3/1992 | Foster . |
| 5,103,866 | 4/1992 | Foster . |
| 5,125,502 | 6/1992 | Foster . |
| 5,222,592 | 6/1993 | Quaeck .............................. 198/750 |
| 5,238,360 | 8/1993 | Foster ................................ 198/750 |
| 5,267,641 | 12/1993 | Hallstrom, Jr. ..................... 198/750 |

*Primary Examiner*—D. Glenn Dayoan
*Attorney, Agent, or Firm*—Graybeal, Jackson, Haley & Johnson

[57] ABSTRACT

A reciprocating floor construction having a plurality of base sections, each of the base sections having a bottom with an interior, a central rib on the bottom interior, and a pair of sides substantially perpendicular to the bottom. Bearings are located on the central rib and on the sides of each of the base sections. The reciprocating floor construction also includes a plurality of slats, with two of the slats located on each of the base sections. Each of the slats has a load bearing portion with an interior and pair of bearing guide channels on the interior. One of the bearing guide channels of each slat contains the bearing on the base section central rib and the other bearing guide channel of the slat contains the bearing on one of the sides of the base section.

15 Claims, 8 Drawing Sheets

RECIPROCATING FLOOR CONSTRUCTION

This application is a continuation-in-part of United States patent application Ser. No. 07/944,697, filed Sep. 14, 1992, entitled LIQUID-TIGHT RECIPROCATING FLOOR CONSTRUCTION, and now U.S. Pat. No. 5,228,556 which is a divisional of United States patent application No. 07/749,522 filed Aug. 26, 1991, entitled LIQUID-TIGHT RECIPROCATING FLOOR CONSTRUCTION, and now issued as U.S. Pat. No. 5,165,525.

BACKGROUND OF THE INVENTION

The present invention pertains to slat-type conveyors for movement of a load. More particularly, the present invention preferably pertains to a liquid-tight reciprocating floor construction for load movement.

Conveyors having interleaved slats in general are disclosed in U.S. Pat. Nos. 3,534,875; 4,143,760; and 4,856,645 all issued to Hallstrom; and U.S. Pat. No. 4,611,708 issued to Foster. U.S. Pat. Nos. 3,534,875 discloses a slat conveyor having three groups of slats, two of which move simultaneously in a load-conveying direction, while at the same time, the third group moves in the opposite direction. In U.S. Pat. Nos. 4,143,760 and 4,611,708, three groups of slats all move simultaneously in a first load conveying direction and then each individual group moves sequentially in the opposite direction. U.S. Pat. No. 4,856,645 teaches a slat conveyor having a group of non-moving "dead" slats spaced between two groups of slats that move simultaneously in a load conveying first direction and sequentially in an opposite direction. All of the above slat conveyors suffer from leakage of liquid containing loads through the spacings between the individual slats and through the supporting floor. This leakage is extremely undesirable when toxic waste such as pesticides, paints, and other chemicals, or garbage is being conveyed. As will be readily apparent below, the liquid-tight reciprocating floor construction of the present invention can be employed with any of the slat reciprocation sequences of the above patents U.S. Pat. No. 4,157,761 discloses a discharge mechanism for discharging particulate loads that includes first and second stoker rods each having a plurality of cross bars. A fixed floor angle is located between each of the cross bars. The first and second stoker rods reciprocate lengthwise, rapidly, and, at the same time but out of phase. Again, the above patent does not disclose a liquid-tight floor construction, and thus suffers from liquid leakage.

U.S. Pat. Nos. 4,492,303; 4,679,686; 4,749,075; and 4,785,929 all issued to Foster disclose various components for reciprocating floor conveyors including hold-down members, bearing systems, and drive/guide systems. However, none of the above references teach a reciprocating floor construction that is liquid-tight.

A need thus exists for a reciprocating floor construction comprised of a plurality of slats slidable on a plurality of stationary liquid-tight bases. The unitary construction of the bases prevents liquid that leaks through the points of contact of each slat and each base from reaching the floor supporting the bases.

The need also exists for the above liquid-tight reciprocating floor construction in which a plurality of bearings cause reciprocation of each slat on each base without compromising the integrity of the base. A need also exists for the above type of liquid-tight reciprocating floor construction in which the base can be fixedly attached to a floor member without causing liquid leakage by compromising the unitary construction of the base.

SUMMARY OF THE INVENTION

The present invention is a reciprocating floor construction for movement of a load, and includes a plurality of slats slidable on a plurality of stationary preferably liquid-tight bases, with each base supporting an individual slat. The preferably unitary construction of the bases prevents liquid that leaks through the points of contact of each slat and each base from reaching the floor supporting the bases.

The bases are interconnected, preferably by either mating flanges or a tongue-in-groove configuration on each base. Seals adjacent the mating flanges or the tongue-in-groove configuration prevent liquid from leaking through these points of attachment to the supporting floor.

In the preferred embodiment of the present invention, the mating flanges or tongue-in-groove configurations are located on the side of each base, and the seals are located between the mating flanges or tongue-in groove configuration.

In an alternate embodiment of the present invention, the side of each base has a top portion, and the seal is located in channel formed in each top portion.

In another alternate embodiment of the present invention the side of each base has an outer beveled edge that forms a channel when fitted against the outer beveled edge of another base. The seal is located in the channel so formed.

In the preferred embodiment of the present invention, each base is fastened to a flanged floor cross-member by a bolt through the flange of the floor cross-member. The head of the bolt holds a lip on the exterior part of the side of the base against the flange of the floor cross-member. A nut on the bolt braces the bolt against the flange. The above configuration allows attachment of the base to the floor cross-member without causing liquid leakage by compromising the unitary construction of the base.

In the preferred embodiment of the present invention, each slat reciprocates relative to each base on three groups of bearings. A side bearing is located between each side of the slat and each side of the base. The slat and base sides are shaped to receive these bearings. Additionally, a central bearing is located between longitudinal bearing support guides on the interior of the load bearing portion of the slat. This central bearing is also supported by a central rib longitudinally bisecting the base. In an alternate embodiment, two slats are located on each base and bearings are secured on the base sides and the base central rib by a pair of bearing guide channels on the interior of the load bearing portions of each slat. The central bearing is preferably substantially u-shaped and each of the side bearings have grooves which allow relative inward movement of the exterior sides of the side bearings such that each side bearing can be fitted into a bearing seat on the top of the base side.

BRIEF DESCRIPTION OF THE DRAWINGS

These and other features of the invention will be more fully appreciated when considered in light of the following specification and drawings in which.

DETAILED DESCRIPTION OF THE PREFERRED EMBODIMENT

The present invention is a reciprocating floor construction, preferably liquid-tight, for movement of loads by sequential slat movement with respect to base portions. Slat reciprocation is accomplished by motor, gearing, and linkage means known in the art, and any one of numerous slat movement sequences also known in the art can be employed. Specific reference is made to the patents described above for examples of slat drive means and slat reciprocation sequences.

Figure 1:
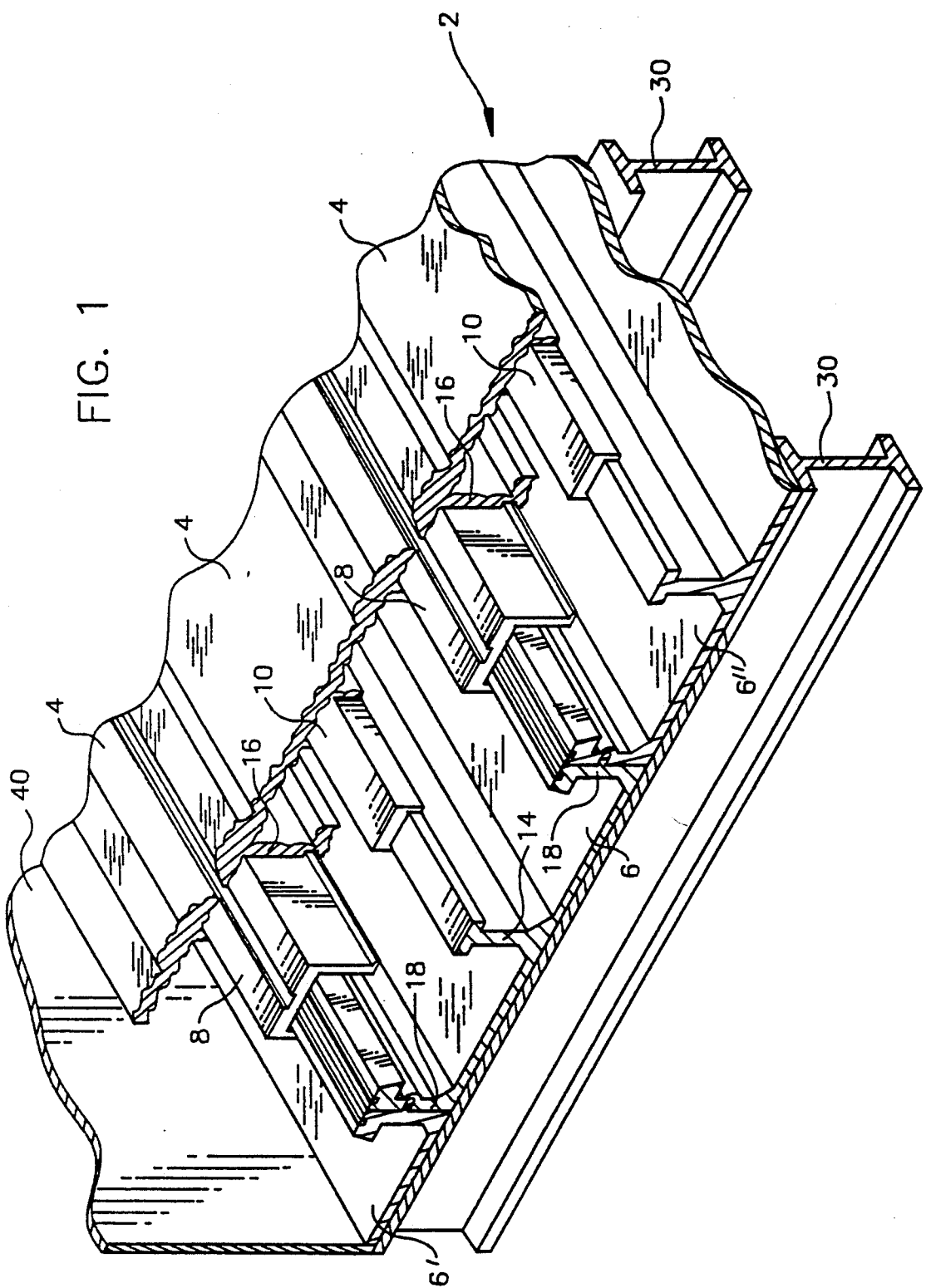
FIG. 1 is a perspective view of a fragmentary portion of a typical embodiment of the liquid-tight reciprocating floor construction of the present invention.
Figure 2:
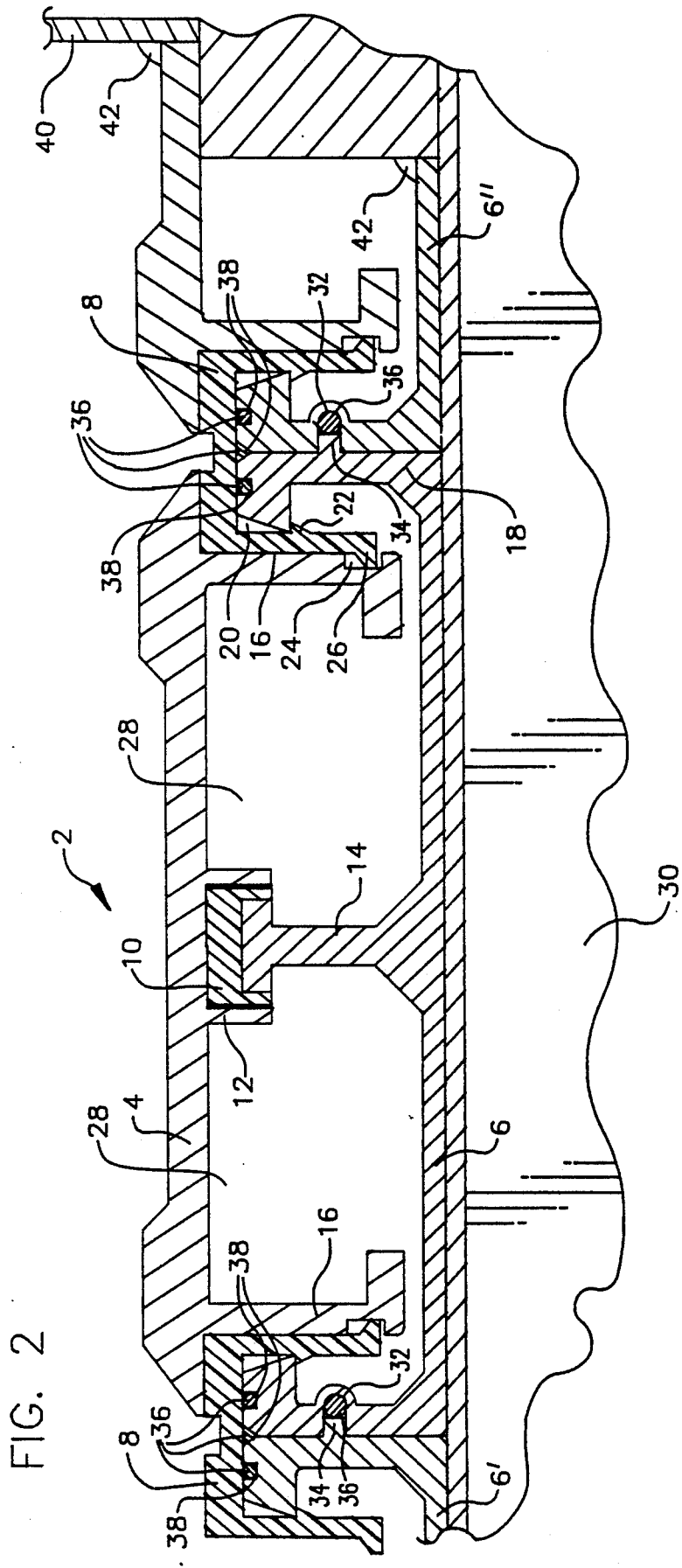
FIG. 2 is an end view of a first embodiment of the present invention of FIG. 1.

Referring to FIGS. 1 and 2, liquid-tight reciprocating floor construction 2 includes slat 4 slidably mounted on base 6. Side bearings 8 and central bearing 10, all preferably being substantially U-shaped, allow sliding reciprocation of slat 4 relative to base 6. Central bearing 10 is braced between central bearing guides 12 on the interior portion of the top of slat 4 and central rib 14 which longitudinally bisects base 6. Each side bearing 8 is held between a side 16 of slat 4 and a side 18 of base 6. Side 18 of base 6 has a sloped face 20 which facilitates attachment of side bearing 8. Side bearing 8 includes a lip 22 that engages side 18 of base 4 below sloped face 20. Side 16 of slat 4 includes a longitudinal groove 24 adapted to mesh with foot 26 located at the end of side bearing 8. Thus, side bearing 8 secures slat 4 to base 6 while allowing slat 4 to reciprocate relative to base 6.

The orientation of slat 4 on base 6 defines a chamber 28. Liquid from a liquid-containing load which collects on the top surface of slat 4 may leak into chamber 28 through the points of contact of sides 16 of slat 4 and side bearings 8. It is important to note, however, that, due to the preferably unitary construction of base 6, any liquid located in chamber 28 cannot pass through base 6 and contact floor member 30. Thus, liquid-tight reciprocating floor construction 2 prevents liquid in chamber 28 or on slat 4 from exiting liquid-tight reciprocating floor construction 2 and contaminating the external environment. It should be noted that the term "unitary" employed to define the construction of base 6 means that base 6 lacks any openings or orifices which communicate with floor member 30.

Base 6 can be fixedly attached to other bases 6' and 6" by a tongue-in-groove attachment construction. In this manner, numerous bases 6 are employed to support numerous slats 4. In this tongue-in-groove construction, the side 18 of base 6 that is adjacent base 6' has a groove 32 therein. Base 6' has a tongue 34 in its side that is oriented to mate with groove 32. On side 18 of base 6 that is adjacent base 6" is another tongue 34. Another groove 32 is located on the side of base 6" at an orientation to mate with the tongue 34 on side 18 of base 6. In this manner, base 6 can be attached to base 6' and base 6".

In order to ensure that liquid in chamber 28 does not exit base 6 at the points of contact of base 6 with base 6' and base 6", seal 36 is employed. Seal 36 is preferably comprised of an elastomeric or a semi-elastomeric polymer composition known in the art. Seal 36 is preferably located between each tongue 34 and groove 32 of the tongue-in-groove constructions connecting base 6 with base 6' and base 6". However, seal 36 can also be located in a channel 38 located in the top of side 18 of base 6. Alternatively, channel 38, containing seal 36, can be located in the top of the side of base 6' and/or base 6". In yet another embodiment of the present invention, two channels 38 containing two seals 36 can be formed by beveling the outer edges of each side 18 of base 6 and the outer edges of the sides of base 6' and 6". In this manner, two V-shaped channels 38 having seals 36 therein are formed.

For bases located adjacent a side wall 40 such as base 6", seals or welds 42 are employed to prevent liquid leakage onto floor member 30. In the present embodiment of the invention as shown in FIGS. 1 and 2, slat 4, base 6 and floor member 30 are all preferably comprised of aluminum or alloys thereof. Thus base 6 is preferably attached to floor member 30 (which is preferably an I-beam) by welding. Prior to welding, channel locks are employed to compress seal 36 when it is located between groove 32 and tongue 34 in order to ensure a liquid-tight attachment of base 6 with base 6' and with base 6".

Figure 3:
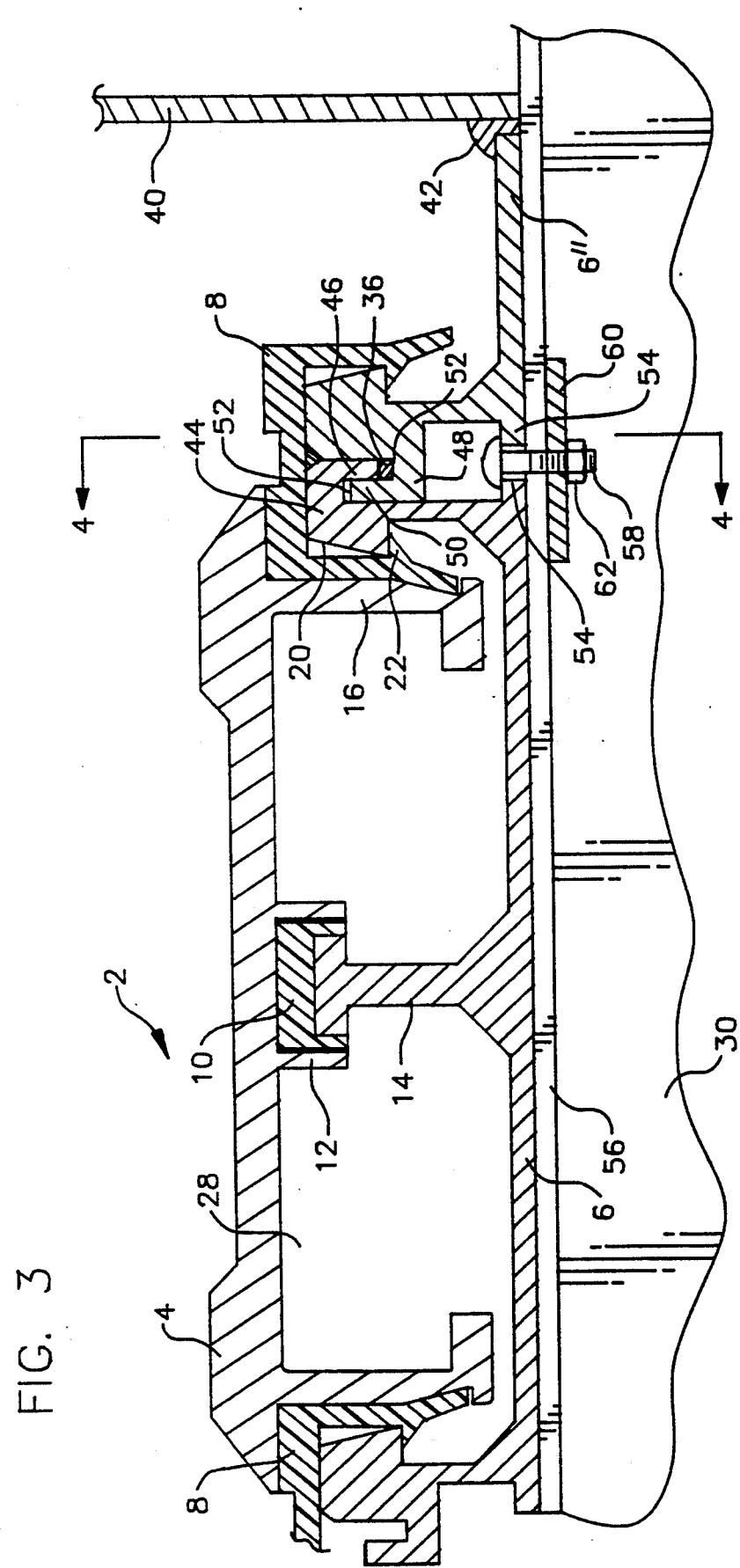
FIG. 3 is an end view of a fragmentary portion of a second embodiment of the present invention.
Figure 4:
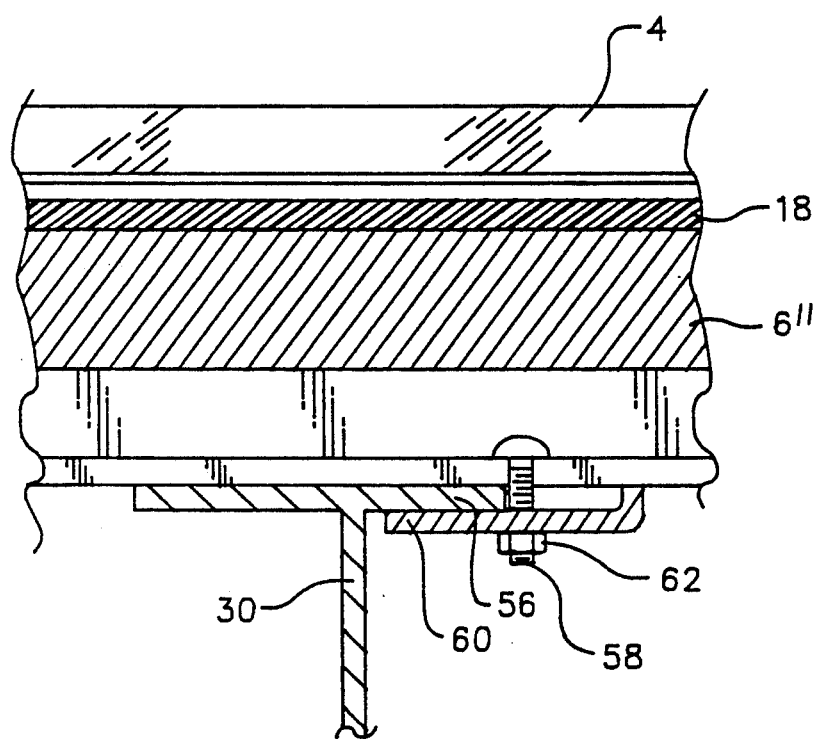
FIG. 4 is a side view of the fragmentary portion of the second embodiment of the present invention.

Referring now to FIGS. 3 and 4, an alternate embodiment of the present invention is shown in which slat 4 and base 6 are preferably comprised of aluminum or its alloys, and floor member 30 (which is preferably an I-beam) is preferably comprised of steel or the like. Due to the difficulties associated with welding aluminum and steel, this embodiment of the present invention contemplates mechanical attachment of base 6 to floor member 30. It is to be noted that reference numerals in FIGS. 3 and 4 which are the same as reference numerals in FIGS. 1 and 2 identify components common to the two embodiments In this second embodiment, instead of a tongue-in-groove construction for the attachment of base 6 with additional bases, complementary shaped flanges on adjacent bases are employed. Specifically, side 18 of base 6 includes flange 44 which is preferably substantially L-shaped having an arm 46 oriented substantially downwardly. Base 6" has a complementary flange 48 having an arm 50 oriented substantially upwardly such that flange 44 and flange 48 mate. Note that each of the L-shaped flanges 44 and 48 thus have a seat 52 in which the arm of the complementary flange resides. Seal 36 can be located in one or both of these seats 52 in order to ensure a liquid-tight connection.

Lips 54 on base 6 and base 6" are located adjacent the points of contact of base 6' and 6" with rib or flange 56 of the preferably I-beam shaped floor member 30. Bolt 58 is adapted to pass adjacent to rib 56 and brace lips 54 against rib 56 of floor member 30. Retainer 60 passes over bolt 58 and braces the underside of rib 56. Nut 62 is threadedly secured to bolt 58 and, when tightened, urges retainer 60 against flange 56 and tightens the contact between the head of bolt 58 and lips 54 such that base 6 and base 6" are securely attached to rib 56 of floor member 30 and flange 44 and flange 48 compress seal 36 to ensure a liquid-tight connection. It is to be noted that the above attachment of base 6 and base 6" to rib 56 of floor member 30 is accomplished without compromising the integrity of the unitary construction of base 6 (and base ") in chamber 28 or of floor member 30 thus reducing the likelihood of liquid leakage.

Figure 5:
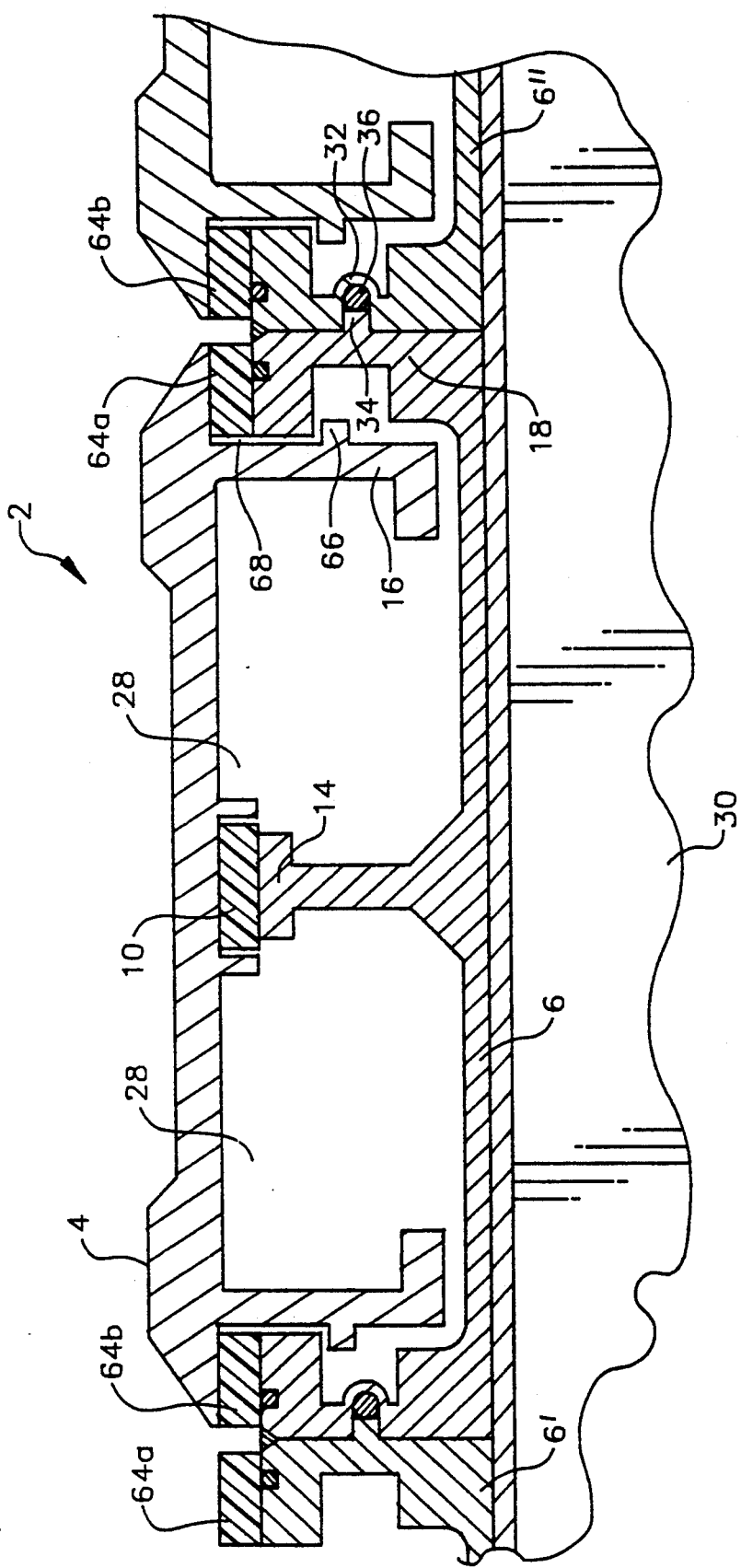
FIG. 5 is an end view of a third embodiment of the present invention.
Figure 6:
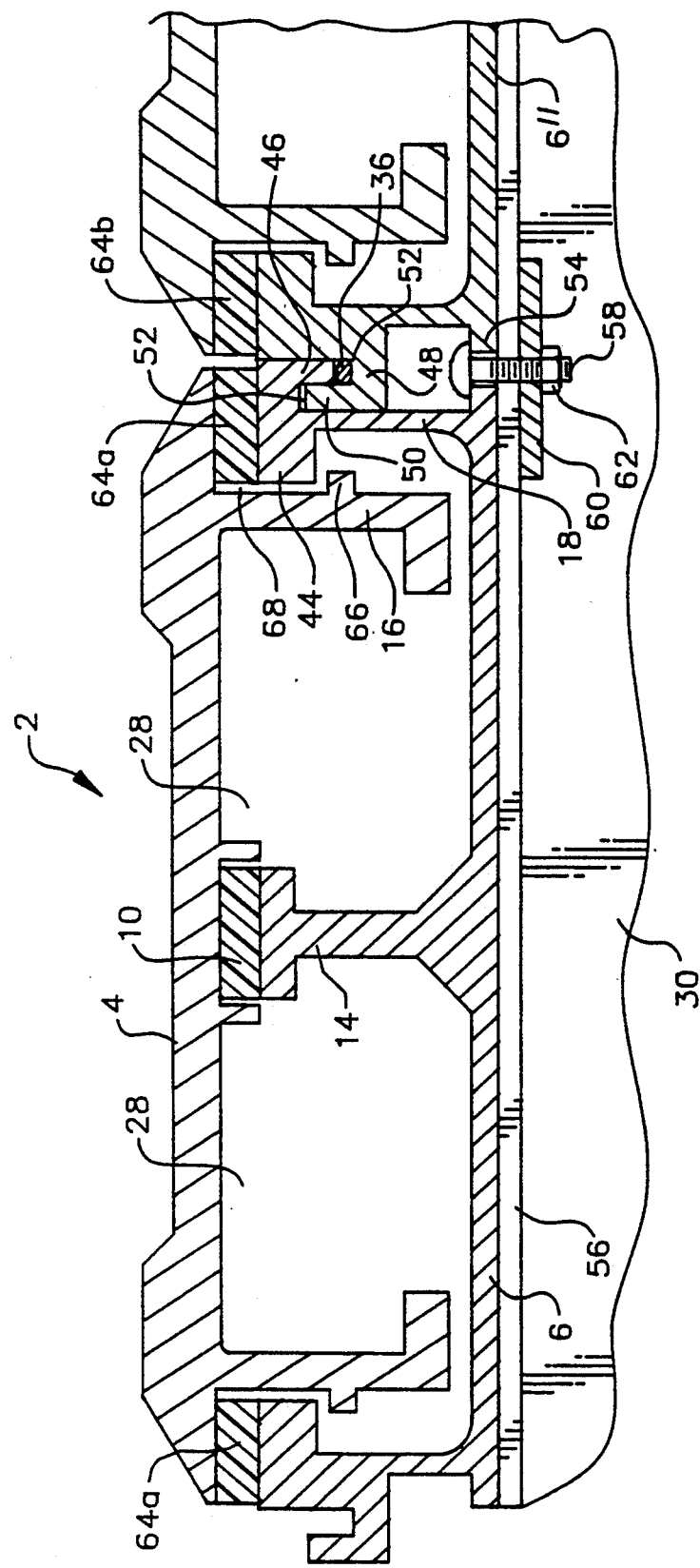
FIG. 6 is an end view of a fourth embodiment of the present invention.

Referring now to FIGS. 5 and 6, third and fourth embodiments of the present invention are shown, respectively. The third embodiment of FIG. 5 employs the tongue-in-groove construction (tongue 34 and groove 32) of the first embodiment of FIGS. 1 and 2 for connecting base 6 with additional bases. The fourth embodiment of FIG. 6 employs the interconnecting flange construction (flange 44 and flange 48) of the second embodiment of FIGS. 3 and 4 for connecting base 6 with additional bases. It is to be noted that the reference numerals in FIGS. 5 and 6 which are the same as reference numerals in FIGS. 1 through 4 identify common elements.

Both FIG. 5 and FIG. 6 disclose embodiments which allow modular construction of a slat 4 and a base 6 by the manufacturer to form a discrete pre-assembled unit prior to acquisition by the ultimate user. Thus, the user can more conveniently assemble liquid-tight floor construction 2 merely by connecting the desired number of these pre-assembled modular units comprised of slat 4 and base 6. Connection by the user is preferably either by the tongue-in-groove construction shown in FIG. 5 and described above in conjunction with FIGS. 1 and 2, or by the interconnecting flange construction shown in FIG. 6 and described above in conjunction with FIGS. 3 and 4

In contrast, the first embodiment of FIGS. 1 and 2 and the second embodiment of FIGS. 3 and 4 are not comprised of modular units of a slat 2 and a base 4 pre-assemblable by the manufacturer. In the first two embodiments, the ultimate user has to first interconnect all of the bases 6, 6', 6", etc., then position all of the required side bearings 8 and central bearings 10, and finally attach all of the slats 4. The above assembly requires the implementation of jigs by the user, and forces the user to undertake additional assembly steps.

The modular unit configuration of liquid-tight floor construction 2 of FIGS. 5 and 6 is mainly due to the use of two separate planar side bearings 64a and 64b in place of the single u-shaped side bearing 8 shown in FIGS. 1 through 4. These side bearings 64a and 64b are preferably comprised of a high density plastic composition known in the art, as is side bearing 8 of FIGS. 1 through 4.

Unlike side bearing 8 of FIGS. 1 through 4, which snaps onto side 18 of base 6 and guides the reciprocation of slat 4 relative to base 6 by meshing of foot 26 of side bearing 8 in longitudinal groove 24 of slat 4, side bearings 64a and 64b of FIGS. 5 and 6 do not guide reciprocation of slat 4 on base 6. Instead, rib 66 on side 16 of slat 4 holds side 18 of base 6 and bearing 64a (or 64b) in channel 68 on side 16 of slat 4 to guide reciprocation of slat 4 relative to base 6.

To assemble each modular unit comprised of a base 6 and a slat 4, the side bearings 64a, for example, are placed on side 16 of base 6 and central bearing 10 is placed on central rib 14. Next, slat 4 is slidably mounted over side bearings 64a and central bearing 10 on base 6 such that side 18 of base 6 is held in channel 68 on side 16 of slat 4 by rib 66. The above modular unit can then be supplied to the ultimate uses in the above pre-assembled configuration. To assemble a liquid-tight floor construction 2 of a desired size, the user then connects the required number of the above pre-assembled modular units by either the above described tongue-in-groove construction or the interconnecting flange construction.

Figure 7:
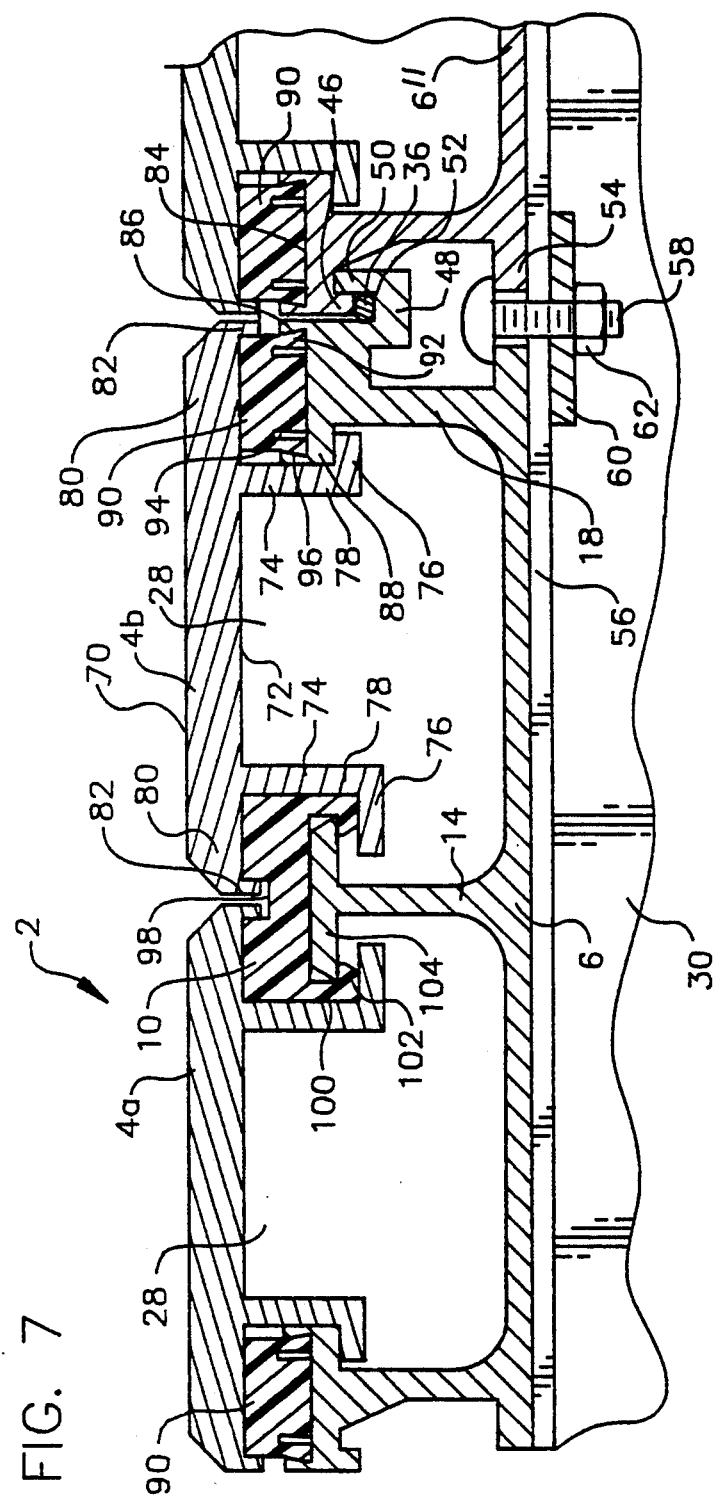
FIG. 7 is an end view of a fifth embodiment of the present invention.
Figure 8:
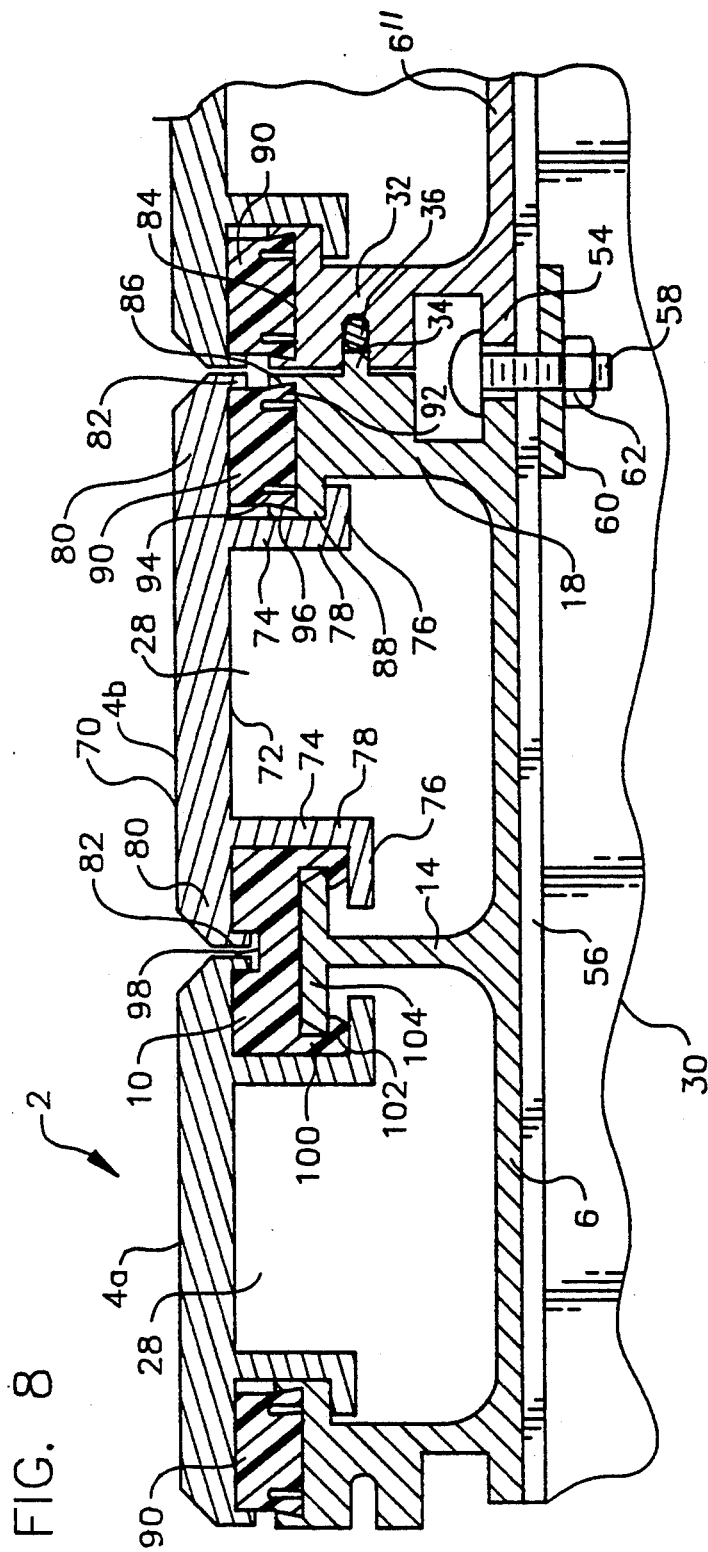
FIG. 8 is an end view of a sixth embodiment of the present invention.

Referring now to FIGS. 7 and 8 the fifth and sixth embodiments of the present invention are shown. As in FIGS. 5 and 6, the embodiments of FIGS. 7 and 8 disclose embodiments which allow modular construction of a slat 4 and a base 6 by the manufacturer to form a discreet preassembled unit prior to acquisition by the ultimate user. Thus, the user can more conveniently assemble the liquid-tight floor construction merely by connecting the desired number of these pre-assembled modular units comprised of slat 4 and base 6. Connection by the user is preferably by either the interconnecting flange construction of FIG. 7 also previously shown in FIG. 6 and described above in conjunction with FIGS. 3 and 4, or by the tongue and groove construction of FIG. 8 previously shown in FIG. 5 and described in conjunction with FIGS. 1 and 2. The modular unit configuration of liquid-tight floor construction 2 of the fifth embodiment of FIG. 7 and the sixth embodiment of FIG. 8, as in the embodiments of FIGS. 5 and 6, is mainly due to the use of two separate planar side bearings 64a and 64b in place of the single u-shaped side bearing 8 shown in FIGS. 1 through 4. It is to be noted that the reference numerals of FIGS. 7 and 8 which are the same reference numerals in FIGS. 1 through 6 identify elements in FIGS. 7 and 8 that are like elements in FIGS. 1 through 6.

Now, more specifically referring to FIGS. 7 and 8, two slats, 4a and 4b, are slidably mounted on base 6. Thus, in contrast to the above embodiments of FIGS. 1 through 6, the fifth and sixth embodiment of FIGS. 7 and 8 preferably disclose a floor construction 2 which employs two slats per base instead of one slat per base. Each of slats 4a and 4b include a load bearing portion 70 having an interior 72. On interior 72 of load bearing portion 70 of slats 4a and 4b are slat sides 74 which are preferably substantially perpendicular to load bearing portion 70. Each side 74 includes a leg 76 which is preferably substantially parallel with load bearing portion 70 of slats 4a and 4b. Thus, leg 76 and side 74, in part, form bearing guide channel 78. Each bearing guide channel 78 is adapted to hold either central bearing 10 or one of side bearings 64a or 64b. Also comprising each bearing guide channel 78 is exterior edge 80, exterior edge 80 being located outwardly of side 74 and being a part of load bearing portion 70. The final element of bearing guide channel 78 is flange 82. Each flange 82 is attached to exterior edge 80 and is preferably substantially perpendicular to load bearing portion 70.

Now turning to base 6, base 6 includes central rib 14 and a pair of external sides 18. Each of external sides 18 includes a bearing seat 84 on the top of side 18. Bearing seat 84 preferably has sides 86 which are, more preferably, angled toward the interior of bearing seat 84. Immediately under bearing seat 84 of base side 18 is lip 88, which is preferably configured to be oriented adjacent to leg 76 of slat side 74 such that reciprocation of slats 4a and 4b are guided on base 6.

Side bearings 64a and 64b preferably include body 90 and a pair of legs 92 spaced from body 90 by grooves 94. Each of legs 92 preferably have an exterior side 96 with an angle complementary to the angle of sides 86 of bearing seat 84. In order to fit side bearings 64a and 64b in bearing seat 84 of sides 18 of base 6, legs 92 of bearings 64a and 64b can be bent toward bearing body 90 due to grooves 94. The resilient quality of the high density plastic composition of bearings 64a and 64b allow legs 92 to then return to their original configuration such that exterior sides 96 of legs 92 are now abutting sides 86 of bearing seat 84, with bearings 64a and 64b now fitted in one of bearing seats 84.

Referring now to central bearing 10, central bearing 10 preferably includes top groove 98 which is oriented such that two adjacent flanges 82 from slat 4a and slat 4b fit into top groove 98 of central bearing 10. Central bearing 10 is preferably substantially u-shaped with a pair of legs 100, each of legs 100 preferably having a lip 102 oriented substantially perpendicularly with respect to leg 100. Preferably, central rib 14 of base 6 is substantially t-shaped in cross-section such that central bearing 10, being preferably comprised of a resilient high density plastic composition, fits over central bearing 14 with lips 102 and legs 100 of central bearing 10 fitted on cross member 104 of central rib 14. Preferably, one of legs 76 of slat side 74 is adapted to be oriented adjacent lip 102 and leg 100 of central bearing 10 such that reciprocation of slats 4a and 4b are guided on base 6 by the orientation of legs 76 of slat sides 74 with respect to lip 102 and leg 100 of central bearing 10, as well as with respect to the orientation of flanges 82 of slat exterior edges 80 with respect to top groove 98 of bearing 10.

While particular embodiments of the present invention have been described in some detail hereinabove, changes and modifications may be made in the illustrated embodiments without departing from the spirit of the invention.

I claim:

1. A reciprocating floor construction comprising:
   a plurality of base sections, each of said base sections having a bottom with an interior, a central rib on said bottom interior, and a pair of sides substantially perpendicular to said bottom, each of said base section sides having a top comprising a bearing seat;
   a plurality of slats, each of said slats on one of said base sections and having a load bearing portion with an interior, a pair of exterior edges with a flange on each of said exterior edges, said flanges oriented substantially perpendicular to said load bearing portion, and a pair of sides on said load bearing surface interior;
   a plurality of central bearings, each of said central bearings having a top groove and a pair of legs, each of said central bearings being on one of said base section central ribs such that said flanges of a pair of said slats fit said top groove of said central bearing and said sides of said pair of slats are adjacent said legs of said central bearing; and
   a plurality of side bearings, each of said side bearings having a body and a pair of legs, each of said legs spaced from said bearing body by a groove such that said side bearing is fitted in said base section bearing seat by bending said bearing legs toward said bearing body.

2. The reciprocating floor construction of claim 1 wherein each of said slat sides has a leg substantially parallel with said slat load bearing portion.

3. The reciprocating floor construction of claim 2 wherein one of said slat side legs is adjacent to one of said central bearing legs.

4. The reciprocating floor construction of claim 2 wherein each of said base section sides has a lip substantially parallel with said base section bottom and is adjacent one of said slat side legs.

5. The reciprocating floor construction of claim 1 wherein said bearing seat of each of said base section sides has angled sides and said legs of each of said side bearings have exterior sides with an angle complementary to the angle of said bearing seat sides.

6. The reciprocating floor construction of claim 1 wherein each of said base sections are unitary in construction, each of said base sections further comprising:
   attachment means connecting said base section to another of said base sections, said attachment means including liquid seal means adjacent said side of said base section for preventing liquid on said reciprocating floor construction from passing said liquid seal means and said side of said base section.

7. The construction of claim 6, wherein said unitary base section includes a side, said side having a top portion with a channel therein, and said liquid seal means is a gasket in said channel.

8. The construction of claim 6, wherein said unitary base section includes a side, said side having an exterior edge beveled to form a channel upon attachment with another base section, and said liquid seal means is a gasket in said channel.

9. The construction of claim 6, wherein said means adapted for attachment of said unitary base section to another base section is a tongue longitudinally disposed on said unitary base section side and is adapted to fit with a groove on another base section.

10. The construction of claim 9, wherein said liquid seal means is a gasket between said tongue and the groove.

11. The construction of claim 6, wherein said unitary base section includes a side and said means adapted for attachment of said unitary base section to another base section is a seat longitudinally disposed on said side and adapted to fit with a flange on another base section.

12. The construction of claim 11, wherein said liquid seal means is a gasket between said seat and the flange.

13. The construction of claim 6, wherein said unitary base section includes a side and said means adapted for attachment of said unitary base section to another base section is a substantially L-shaped flange adapted to mate with a complementary substantially L-shaped flange on another base section.

14. The construction of claim 13, wherein said liquid seal means is a gasket between said substantially L-shaped flange of said unitary base section and the complementary substantially L-shaped flange.

15. The construction of claim 6, wherein said unitary base section includes a side, said construction further comprising:
   a lip on said side; and
   fastening means adapted to secure said unitary base section to a floor portion having a flange, said fastening means oriented through the flange, said fastening means including an elongate member having a broadened head for placement of said lip of said unitary base section thereunder and against the flange, said fastening means also having a removable retainer to be braced against the flange.

* * * * *